United States Patent [19]
Monzen et al.

[11] Patent Number: 5,662,843
[45] Date of Patent: Sep. 2, 1997

[54] METHOD FOR THE PRODUCTION OF POLYOLEFIN HOLLOW FIBER FILTER BUNDLES

[75] Inventors: Takashi Monzen; Masaharu Watanabe, both of Kitakoma-gun, Japan

[73] Assignee: Kitz Corporation, Japan

[21] Appl. No.: 571,433

[22] Filed: Dec. 13, 1995

Related U.S. Application Data

[62] Division of Ser. No. 220,195, Mar. 30, 1994, Pat. No. 5,505,858.

[30] Foreign Application Priority Data

Dec. 17, 1993 [JP] Japan ..................................... 5-343355

[51] Int. Cl.$^6$ ............................. B01D 67/00; B01D 69/08; B01D 71/26
[52] U.S. Cl. .................................. 264/41; 96/8; 210/496; 210/500.23; 210/500.36; 264/145
[58] Field of Search ............................. 210/496, 500.23, 210/500.36, 506, 508, 450; 264/41, 42, 43, 145, 147, 258; 96/10, 8

[56] References Cited

U.S. PATENT DOCUMENTS

| | | |
|---|---|---|
| 4,257,997 | 3/1981 | Soehngen et al. .................. 264/145 |
| 4,323,454 | 4/1982 | Fritzsche et al. . |
| 4,369,605 | 1/1983 | Opersteny et al. .................. 51/319 |
| 5,066,397 | 11/1991 | Muto et al. .................. 96/8 |
| 5,158,680 | 10/1992 | Kawai et al. . |
| 5,238,735 | 8/1993 | Nagou et al. .................. 210/500.23 |
| 5,354,470 | 10/1994 | Seita et al. . |
| 5,505,858 | 4/1996 | Monzen et al. .................. 210/500.23 |

FOREIGN PATENT DOCUMENTS

| | | |
|---|---|---|
| 1-218605 | 8/1989 | Japan . |
| 3-245826 | 11/1991 | Japan . |
| 4-63117 | 2/1992 | Japan . |

*Primary Examiner*—Joseph W. Drodge
*Attorney, Agent, or Firm*—Wenderoth, Lind & Ponack

[57] ABSTRACT

A filter element includes a bundle of hollow fibers made of first polyolefin. The bundle has at least one end sealed with second polyolefin having an average molecular weight in the range of 1,000 to 16,000. The filter element is produced by a method including the steps of fusing the second polyolefin having a fusion point lower than that of the first polyolefin, attaching the fused second polyolefin to at least one end of the bundle, allowing the attached second polyolefin to set, thereby providing the bundle with a sealed portion, and cutting off the leading end of the sealed portion.

4 Claims, 2 Drawing Sheets

METHOD FOR THE PRODUCTION OF POLYOLEFIN HOLLOW FIBER FILTER BUNDLES

This is a Rule 60 divisional application of Ser. No. 08/220,195, filed Mar. 30, 1994, now U.S. Pat. No. 5,505,858.

BACKGROUND OF THE INVENTION

1. Field of the Invention

The present invention relates to a filter element highly resistant to solvents and comprising a bundle of hollow fibers which has at least one end sealed with a thermoplastic resin material, and relates also to a method for the production thereof.

2. Description of the Prior Art

In conventional filter elements of this kind, at least one end of a bundle of hollow fibers is sealed with urethane adhesive. Use of such urethane adhesive leads to good workability when providing the at least one end of the bundle with a sealed portion. A filter module having such a conventional filter element contained in a housing exhibits sufficient durability to water. However, it is inferior in durability to an aqueous alcohol solution or organic solvents such as alcohol.

In view of the above, filter elements each comprising a bundle of hollow fibers which has at least one end sealed with a thermoplastic resin material resistant to solvents have recently been developed. Such filter elements are disclosed, for example, in Japanese Patent Non-examined Publications No. 1-218605, No. 3-245826 and No. 4-63117.

However, use of such thermoplastic resin has disadvantages in (1) that the step of forming a sealed portion requires a treating temperature higher than in the case of using urethane adhesive in order to obtain fluidity of the resin, resulting in thermal deformation of the hollow fibers and possible destruction of the inside diameters of the hollow fibers depending on a combination with the material of which the hollow fibers are made, (2) that since thermoplastic resin has viscosity higher than that of urethane adhesive, it fails to propagate over the entire spaces between the adjacent hollow fibers even if it should gain fluidity, resulting in an incomplete sealed portion, and (3) that thermoplastic resin encounters volume shrinkage larger than that of urethane adhesive during its setting, resulting in an incomplete sealed portion having crazing and/or cavities.

The first cited Japanese Publication discloses a method for the formation of a sealed portion of a bundle of hollow fibers by filling the inside of the ends of the hollow fibers with calcium carbonate so as not to induce thermal deformation, then sealing the spaces between the adjacent ends of the hollow fibers with fine particles of thermoplastic resin same as the thermoplastic resin of which the hollow fibers are made, and melt bonding the ends of the hollow fibers. This method requires the steps of removing the calcium carbonate by dissolving it in concentrated hydrochloric acid which will constitute waste matter and disposing of the waste matter, and encounters some difficulty in melt bonding the ends of the hollow fibers liquid-tightly over the entire area using finely particulate sealing material and failure to melt bond the center portion of the bundle of hollow fibers. Thus, this prior art cannot eliminate the disadvantages (2) and (3) mentioned above.

The second cited Japanese Publication discloses a method for the formation of a sealed portion of a bundle of hollow fibers, which adopts the step of causing the sealed portion to set from the lower part thereof to eliminate the aforesaid disadvantage (3) and uses, as a material for hollow fibers, engineering plastic generally exhibiting high resistance to heat, including polysulfone, polyether sulfone and polyimide and, as a sealing material, thermoplastic resin including polyolefin, polyvinyl chloride, nylon and polyester. This method requires that the melting point of the material for hollow fibers be much higher than that of the sealing material and cannot eliminate the aforesaid disadvantage (2).

The third cited Japanese Publication discloses a method for the formation of a sealed portion of a bundle of hollow fibers, which uses a first polyolefin as a material for hollow fibers and, as a sealing material, a second polyolefin having a melting point lower than that of the first polyolefin and adopts the use of a suspension of the second polyolefin for sealing the ends of the hollow fibers. The products obtained in accordance with this method, however, are not stable in liquid tightness. Thus, this method produces no satisfactory results.

The present invention has been proposed for the purpose of solving the problems mentioned above.

An object of this invention is to provide a filter element highly resistant to solvents and chemicals.

Another object of this invention is to provide a method for the production of the filter element at low cost.

SUMMARY OF THE INVENTION

To attain the above objects, according to this invention there is provided a filter element comprising a bundle of hollow fibers made of first polyolefin, which bundle has at least one end sealed with second polyolefin having an average molecular weight in the range of 1,000 to 16,000 and also provided is a method for the production of the filter element comprising a bundle of fibers made of a first polyolefin having a melting point, which method comprises the steps of melting a second polyolefin having an average molecular weight in the range of 1,000 to 16,000 and a melting point lower than the melting point of the first polyolefin, attaching the fused second polyolefin to at least one end of the bundle, allowing the attached second polyolefin to set, thereby providing the bundle with a sealed portion, and cutting off a leading end of the sealed portion.

The above and other objects, features and advantages of this invention will become more apparent from the description given in detail hereinbelow with reference to the accompanying drawings.

DETAILED DESCRIPTION OF THE PREFERRED EMBODIMENTS

The present invention will now be described with reference to the illustrated embodiments.

Figure 1:
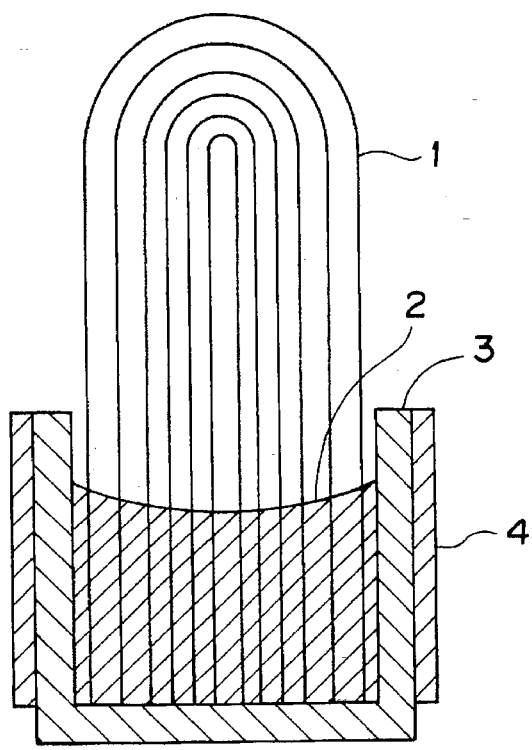
FIG. 1 is an explanatory cross section showing one embodiment of a method for producing a filter element according to this invention.
Figure 2:
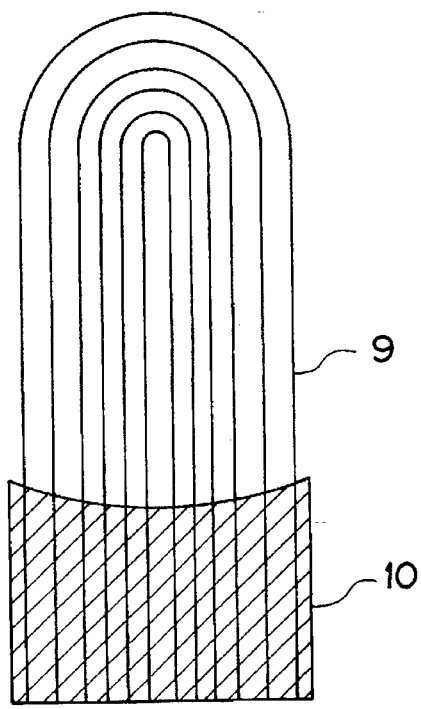
FIG. 2 is a cross section showing the filter element produced by the method.

A bundle 1 of hollow fibers made of a first polyolefin is prepared. A second polyolefin having an average molecular weight in the range of 1,000 to 16,000 and a melting point lower than that of the first polyolefin is fused in a mold 3 by heating the mold with a heating means 4. The difference between the melting points of the first and second polyolefins falls within 30° C. The melted second polyolefine 2 in the mold 3 is left standing until it has a temperature not higher than the melting point of the first polyolefin while maintaining its fluidity. The prepared bundle 1 is then immersed in the melted second polyolefin 2 as shown in FIG. 1. The bundle 1 is removed from the mold 3 immediately before the melted second polyolefin 2 loses its fluidity, and the second polyolefin attached to the bundle 1 is allowed to set. As a result, a filter element 9 having a sealed portion 10 of the second polyolefin is obtained as shown in FIG. 2.

The second polyolefin includes low-density polyethylene having an average molecular weight of 6,000 or less, high-density polyethylene having an average molecular weight of 7,000 or less, and polypropylene having an average molecular weight of 16,000 or less. Polypropylene or high-density polyethylene is preferable when a filter element being obtained is required to be sterilized with steam. Since the second polyolefin in a melted state exhibits lower viscosity than ordinary polyolefin, it can be melted by heating the mold 3 to a temperature of 200° C. and holding the mold 3 at that temperature for several minutes, and the melted second polyolefin contains no air bubbles therein and is transparent and homogenous. Therefore, it is unnecessary to subject the melted second polyolefin to degassing under a reduced pressure. Where any problem may possibly arise when air is contained in the fused second polyolefin, the degassing step may be adopted.

When the hollow fibers of the bundle 1 are made of high-density polyethylene, high-density polyethylene having a low molecular weight or low-density polyethylene having a low molecular weight is preferably used as the second polyolefine. When the hollow fibers are made of polypropylene, polypropylene having a low molecular weight, high-density polyethylene having a low molecular weight or low-density polyethylene having a low molecular weight is preferably used as the second polyolefin. These combinations of the first and second polyolefins can avoid thermal deformation of the bundle 1 of hollow fibers and produce a completely sealed portion 10 having the second polyolefin propagating entirely over at least one end of the bundle 1.

As described above, the bundle 1 is removed from the mold 3 immediately before the melted second polyolefin 2 loses its fuidity, and the second polyolefin attached to the bundle 1 is allowed to set outside the mold 3. The removal of the bundle 1 from the mold 3 is carried out preferably when the temperature of the mold 3 is in the range between the melting point of the second poloyolefin and a temperature not exceeding the temperature 10° C. higher than the melting point of the second polyolefin. By so doing, the second polyolefin can firmly be attached to the bundle 1. In addition, since the second polyolefin attached to the bundle 1 is allowed to set outside the mold 3, there is no possibility of the sealed portion 10 suffering from crazing and/or cavities by virtue of volume shrinkage of the second polyolefin. Therefore, a filter element having at least one end sealed completely with the second polyolefin can be obtained.

Figure 3:
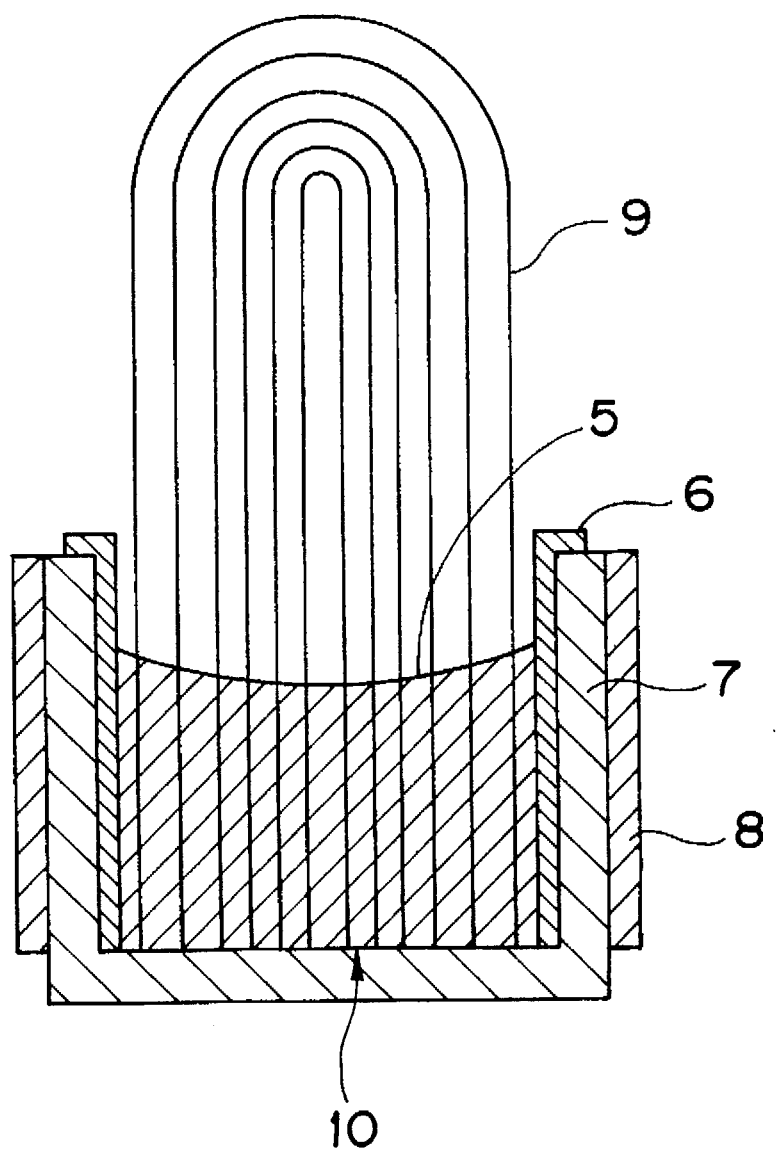
FIG. 3 is an explanatory cross section showing another embodiment of a method for producing a filter element according to this invention.

In order to obtain a filter element having a more completely sealed portion, the filter element 9 shown in FIG. 2 is inserted at its sealed portion 10 into another mold 7 having a bottomless nylon cup 6 attached to the inside thereof and a heating means 8 attached to the outside thereof as shown in FIG. 3. The mold 7 contains either melted polyolefin of a low molecular weight which may be the same as the second polyolefin or a melted mixture of the low molecular polyolefin and ordinary polyolefin having an average molecular weight larger than that of the low molecular polyolefin. The filter element 9 is removed from the mold 7 and allowed to set in the same manner as described above. The filter element 9 thus obtained is associated with a given support cylinder via an O-ring or the like into a filter module.

A given support cylinder made of ordinary polyolefin of the same type as the low molecular polyolefin may inserted into the mold 7. In this case, the filter element being obtained can be used as a filter module.

In case where the mold 7 contains a melted low molecular polyolefin and where a given support cylinder is not inserted into the mold 7, there is a possiblity that a filter element being obtained has a sealed portion liable to break when receiving a large external impact. This can be avoided by using the aforementioned fused mixture instead of the melted low molecular polyolefin.

Examples of the ordinary polyolefin include low-density polyethylene, linear low-density polyethylene, high-density polyethylene and polypropylene. The content of the ordinary polyolefin in the mixture is preferably in the range of 10 to 30% by weight.

According to the method of this invention, even when hollow fibers constituting a bundle are made of engineering plastic having a higher melting point than polypropylene, use of the low molecular polyolefin can eliminate otherwise possible thermal deformation of the bundle and provide a completely sealed portion having the low molecular polyolefin fully propagating the spaces between the adjacent hollow fibers.

The advantages of the present invention will become more apparent from a working example and comparative experiments which will be described hereinafter.

EXAMPLE 1

A bundle 1 was prepared by bundling 3,000 hollow fibers made of polypropylene. A mold 3 containing high-density polyethylene having an average molecular weight of 3,000 was heated by a heater 4 until the melted polyolefin had no air bubbles therein. The application of heat was then stopped and the mold 3 was left standing. As soon as the temperature of the mold 3 was 160° C., the bundle 1 was inserted into the melted polyolefin and left standing. When the mold temperature became 120° C., then the bundle 1 was removed from the mold 3 to obtain a filter element 9 having a sealed portion 10 at one end thereof.

Another mold 7 having a bottomless nylon cup 6 attached fast to the inside thereof and a mixture 5 of high-density polyethylene having an average molecular weight of 3,000 and 20% by weight of straight-chain polyethylene (MFR80 as specificed under ASTM) contained inside the cup 6 was heated by a heater 8 until the melted mixture 5 had no air bubbles therein. The application of heat was then stopped and the mold 7 was left standing. As soon as the mold temperature was 130° C., the sealed portion 10 of the filter element 9 was inserted into the melted mixture 5. When the temperature of the mold 7 became 100° C., then the filter element 9 having the cup 6 attached to the further sealed portion thereof was removed from the mold 7 and allowed to set. After the further sealed portion had set sufficiently, the attached cup 6 was removed. As a result, a filter element 9 having the end portion 10 sealed completely with polyolefin. Neither crazing nor cavities could be observed in the sealed portion 10.

The leading end of the sealed portion 10 of the filter element 9 thus obtained was cut off to form an open surface of the filter element 9. The filter element 9 was fixed to the inside of a pressure container with the sealed portion 10 sealed with an O-ring. Then, water pressure of 4 kg/cm$^2$ was applied to the filter element 9. However, no leak of water from between the hollow fibers could be found at the cut open surface of the filter element 9.

With the filter element 9 fixed inside the pressure container, 10 l of ethyl alcohol was filtered. Then, the filter element 9 was removed from the pressure container, dried in an oven heated to 60° C. and fixed again to the inside of the pressure container. Thereafter water pressure of 4 kg/cm$^2$ was applied to the filter element 9. However, no leak of water could be found at the cut open surface of the filter element 9. Although this test was repeated five times, no leak of water could be recognized at the cut open surface of the filter element 9.

COMPARATIVE EXPERIMENT 1

A bundle 1 was prepared in the same manner as in Example 1 and the same procedure as in Example 1 was taken until the insertion of the bundle 1 into the melted polyolefin. When the temperature of the mold 3 became room temperature, the bundle 1 is removed from the mold 3 to obtain a filter element 9 having a sealed portion 10 at one end thereof.

The leading end of the sealed portion 10 of the filter element 9 thus obtained was cut off to form an open surface of the filter element 9. As a result, crazing was observed in the cut open surface.

The filter element 9 was fixed in the same manner as in Example 1 and subjected to water pressure of 4 kg/cm$^2$. As a result, leak of water from between the hollow fibers was found at the cut open surface of the filter element 9.

COMPARATIVE EXPERIMENT 2

A bundle 1 was prepared in the same manner as in Example 1 and a filter element 9 having a sealed portion 10 was obtained in the same manner as in Example 1 except that urethane adhesive was used as the sealing material.

The leading end of the sealed portion 10 of the filter element 9 thus obtained was cut off to form an open surface of the filter element 9. As a result, crazing was observed in the cut open surface.

The filter element 9 was fixed in the same manner as in Example 1 and subjected to water pressure of 4 kg/cm$^2$. As a result, no leak of water from between the hollow fibers could be found at the cut open surface of the filter element 9.

The same test as in Example 1 effecting filtration of ethyl alcohol and application of water pressure of 4 kg/cm$^2$ was repeated. As a result, after the second and subsequent tests leak of water from between the hollow fibers was observed at the cut open surface of the filter element 9.

As is clear from Example 1 and Comparative Experiments 1 and 2, according to the present invention, it is possible to provide a filter element made of polypropylene applicable to filtration of not only water but also an organic solvent, more inexpensive than filter elements made of an engineering plastic material, and excellent in quality and reproducibility without forming crazing and/or cavities in its sealed portion.

What is claimed is:

1. A method for the production of a filter element, comprising the steps of:
   (a) preparing a bundle of hollow fibers made of a first polyolefin having a melting point;
   (b) melting a second polyolefin having an average molecular weight in the range of 1,000 to 16,000 and a melting point lower than the melting point of said first polyolefin;
   (c) attaching the molten second polyolefin to at least one end of said bundle;
   (d) allowing the attached second polyolefin to set, thereby providing said bundle with a sealed portion; and
   (e) cutting off one end of said sealed portion at said at least one end of said bundle,
   wherein step (b) is carried out in a mold, step (c) is carried out by immersing said at least one end of said bundle into the molten second polyolefin in said mold, and step (d) is carried out after said bundle is removed from said mold; and further comprising the steps of (f) immersing said sealed portion of said bundle into a separately prepared molten second polyolefin contained in another mold, and (g) allowing said separately prepared molten second polyolefin attached to said sealed portion to set, said steps (f) and (g) being carried out before step (e), and
   wherein said another mold further contains in a molten state one polyolefin, selected from the group consisting of low-density polyethylene, linear low-density polyethylene, high-density polyethylene and polypropylene, admixed with said separately prepared molten second polyolefin.

2. The method according to claim 1, wherein said first polyolefin is one member selected from the group consisting of polypropylene and high-density polyethylene.

3. The method according to claim 2, wherein the difference between the melting point of said first polyolefin and that of said second polyolefin of step (b) falls within 30° C.

4. The method according to claim 1, wherein the difference between the melting point of said first polyolefin and that of said second polyolefin of step (b) falls within 30° C.

* * * * *